United States Patent
Colvin, Jr.

(10) Patent No.: US 7,500,638 B2
(45) Date of Patent: Mar. 10, 2009

(54) HEAVY LIFT AIRSHIP

(76) Inventor: Charles Roy Colvin, Jr., 1942 Seakale La., Houston, TX (US) 77062

( * ) Notice: Subject to any disclaimer, the term of this patent is extended or adjusted under 35 U.S.C. 154(b) by 342 days.

(21) Appl. No.: 11/474,901

(22) Filed: Jun. 24, 2006

(65) Prior Publication Data

US 2007/0295859 A1    Dec. 27, 2007

(51) Int. Cl.
- B64B 1/58 (2006.01)
- B64B 1/62 (2006.01)
- B64B 1/06 (2006.01)

(52) U.S. Cl. .............. 244/97; 244/98; 244/30
(58) Field of Classification Search ............ 244/24, 244/31, 30, 159.2, 98, 128, 26, 125, 97, 96, 244/126
See application file for complete search history.

(56) References Cited

U.S. PATENT DOCUMENTS

| | | | | |
|---|---|---|---|---|
| 1,144,578 | A * | 6/1915 | Andersson | 244/30 |
| 2,428,656 | A * | 10/1947 | Elliott et al. | 244/97 |
| 3,096,047 | A * | 7/1963 | Dunn, Jr. | 244/26 |
| 3,972,493 | A | 8/1976 | Milne | |
| 4,052,025 | A | 10/1977 | Clark | |
| 4,272,042 | A * | 6/1981 | Slater | 244/115 |
| 4,773,617 | A | 9/1988 | McCampbell | |
| D309,887 | S * | 8/1990 | Ninkovich | D12/325 |
| 5,285,986 | A | 2/1994 | Hagenlocher | |
| 5,516,065 | A | 5/1996 | Hagenlocher | |
| 5,823,468 | A * | 10/1998 | Bothe | 244/2 |
| 6,311,925 | B1 | 11/2001 | Rist | |
| 6,386,480 | B1 * | 5/2002 | Perry et al. | 244/24 |
| 6,619,586 | B1 * | 9/2003 | Barnes, III | 244/97 |
| 6,739,549 | B2 * | 5/2004 | Senepart | 244/24 |
| 6,766,982 | B2 * | 7/2004 | Drucker | 244/96 |
| 6,805,319 | B2 | 10/2004 | Senepart | |
| 2006/0065777 | A1 * | 3/2006 | Walden et al. | 244/97 |

OTHER PUBLICATIONS

Joner, B.A. and Schneider, J.J.; "Evaluation of Advanced Airship Concepts", AIAA Lighter Than Air Technology Conference. Snowmass, Colorado / Jul. 15-17, 1975.
Donald E. Fink; "Hybrid Heavy-Lift Vehicle Under Study"; Aviation Week & Space Technology. Jul. 29, 1974.

* cited by examiner

Primary Examiner—Timothy D Collins
Assistant Examiner—Stephen Brookman
(74) Attorney, Agent, or Firm—Michael A. Ervin; M. A. Ervin & Associates (57) ABSTRACT

A large heavy lift airship of lenticular shape divided into upper and lower convex shaped halves and configured with horizontal configurations in each half made up of four quadrants of inter-connected buoyant gas cells in which the interconnections consist of inline heat exchangers and blowers that control temperatures and buoyancy, giving a high degree of buoyancy, attitude and trim control. The flat lenticular design and large lifting capacity allows for a very large passenger or cargo deck positioned in the center of the airship, dividing it into its upper and lower convex shaped halves.

10 Claims, 9 Drawing Sheets

Prior Art

HEAVY LIFT AIRSHIP

BACKGROUND OF THE INVENTION

This invention pertains to the art of aircraft that can transport substantial amounts of cargo, and more particularly, to lighter than air (LTA) aircraft that can perform this function.

Jet cargo planes have developed as one way to transport large amounts of cargo. The Boeing 747, for example, was designed to serve either as a passenger jet or as an all-cargo transport. 747's are able to carry 100 tons (180,000 lbs.) of cargo.

Lighter than air (hereafter "LTA") airships are generally known, but their ability to successfully transport substantial amounts of cargo has, until now, been limited. U.S. Pat. No. 4,052,025 discloses a large semi-buoyant lift-augmented aircraft. The Jul. 29, 1974 issue of "Aviation Week & Space Technology" discloses a hybrid heavy-lift, semi-lighter than air vehicle dubbed the Megalifter. The American Institute of Aeronautics and Astronautics' conference held in Snowmass, Colo. On Jul. 15-17, 1975 resulted in the AIAA Paper No. 75-930 which discloses "An Evaluation of Advanced Airship Concepts." This paper discloses multiple LTA aircrafts.

The dirigible "Hindenburg", LZ-129 was 135 feet in diameter, 803 feet in length, and had a volume of over seven million cubic feet. There was space and luxury for her seventy passengers and sixty crewmembers that is unmatched to this day in any kind of aircraft. The upper deck was 49 by 92 feet. A dining room 15 by 50 feet ran along the port side. Seating was for 34 persons and the tables were laid with white linen napkins and tablecloths, fresh-cut flowers, fine silver, and a special china service created for the "Hindenburg". On the starboard side was a 34 foot lounge beautifully furnished and with a baby grand piano. Off the lounge was a 16-foot writing room, magnificently decorated to reflect the history of lighter-than-air flight. Outboard of these public rooms and separated from them by a low railing were fifty-foot promenades connected by a cross-passage between the two sides of the second deck. This provided a walking distance of nearly 200 feet. Outboard of the promenades were six large Plexiglas windows slanting outwards at 45 degrees. These were often left open, as there was no draft in or out even at air speeds of eighty knots. In the center of the second deck were the sleeping cabins, each with a washbasin and hot and cold running water. The lower deck contained the galley and a smoking room. There were eleven freight rooms along the keel, of which the largest would hold 5,500 pounds of freight. In fourteen months of service, the "Hindenburg" crossed the ocean thirty four times, carrying a total of 6000 passengers, and traveled 209,481 miles in 3088 hours of flight.

In World War II, a program was initiated to build and equip the navy with squadrons of submarine hunting non-rigid airships. Between 1940 and 1946, approximately 175 Blimps were constructed to patrol the sea-lanes. The workhorse of this operation was the 450 thousand cubic foot "K" ship. The largest Blimp was the "N" type such as the ZPG—3W which was 403 feet in length and had a helium capacity of 1.5 million cubic feet. About 1961 LTA was phased out of the navy. Today there are only a few private blimps of about 150-200,000 cubic foot capacities flying about the country.

As the capabilities and safety of airplanes continued to improve the support for further development of rigid airships rapidly diminished and the airship era quickly died. Within a period of 60 years, LTA aircraft, both rigid and non-rigid, were developed, accomplished a mission, and then all but disappeared from the skies.

The large rigid airships of this earlier era, such as the Akron, the Macon, the Graf Zeppelin, and the Hindenburg, had gross gas volumes of around 7 million cubic feet, typically with 95% or more fullness of buoyant gas. This enabled them to carry pay loads of between 160,000 to 220,00 lbs. The high degree of fullness that was required limited their altitudes to roughly 2000 feet, a serious limitation in cross-country trips when even modest mountain ranges intervened.

Furthermore, some prior airships combine aerodynamic lifting with buoyant lifting in an attempt, primarily, to gain airspeed and improve payload capacity. Such aero-lift-augmented airships derive aerodynamic lift either integrally through high-lifting hull configurations or externally through the addition of special lifting surfaces or airfoils on an otherwise conventional appearing hull or fuselage. However, such hybrid additions introduced increased structural weight as well as hull/lifting surface interference drag.

These large airships of previous eras also required large crews to man the ship and large ground crews to safely dock them. The costs of these crews were another economic driving force against the use of rigid airships.

Airship enthusiasts have continued to talk up the advantages of rigid airships for luxury travel and carrying bulk cargo, but have recognized that much more lifting capacity would be required to make them economically viable. As airships get bigger and bigger, they should get better and better in lifting capacity and operating economics. Since lift capacity is proportional to the volume of lifting gas such a large lifting capacity would enable the design of a high capacity cargo carrier and/or the design of a large and luxurious passenger ship. In addition the issue of maximum pressure height (altitude) of the airship can only be addressed by more gas volume. Such a larger airship must also address the issue of control of buoyancy and trim for safe and stable control in flight.

There is a need then for a new type of airship that has very large carrying capacity, without the need for dynamic lift, as well as the capability to selectively adjust the buoyant lift for stable control of the airship. Such an airship though needs to be much simpler to dock than earlier designs. The airship of the instant invention addresses these needs.

BRIEF SUMMARY OF THE INVENTION

It is therefore an aspect of the instant invention to provide a very large gas volume airship of lenticular shape.

It is a feature of the instant invention that the airship will have multiple cells for containing a buoyant gas.

It is another feature of the instant invention that the buoyant gases in the multiple cells in the airship are heated or cooled to control buoyancy.

It is another feature of the instant invention that the heating and cooling of the buoyant gas is done by internal heat exchangers.

It is another feature of the instant invention that the central horizontal plane of the airship contains a large deck for passengers or cargo.

It is another feature of the instant invention that the airship has a landing and anchoring mechanism at the bottom center of the airship as opposed to the nose cone.

These and other aspects and features are achieved by the present invention by providing a rigid airship comprising cells for holding a buoyant gas; the cells configured to pass said buoyant gas through heat exchangers to selectively control the individual temperature and buoyancy of the cells.

Further aspects and features are achieved by the present invention by providing a rigid airship wherein the airship has a lenticular shape comprising an upper convex part and a lower convex part.

Further aspects and features are achieved by the present invention by providing a rigid airship with a landing and anchoring mechanism located at the bottom point of the lower convex part of the airship and comprising a docking device for anchoring the airship and providing an entry and exit point for passengers and cargo.

Further aspects and features are achieved by the present invention by providing a method of controlling the buoyancy of a rigid airship comprising the steps of; providing multiple gas cells within the airship comprising buoyant gas; providing heat exchangers to independently raise or lower the buoyant gas temperature in the multiple gas cells; providing computer control to sense the altitude and trim of the airship and the buoyant gas temperatures within the multiple gas cells and to adjust the buoyant gas temperature in the multiple gas cells to approach desired set points of altitude and trim.

DETAILED DESCRIPTION OF THE INVENTION

Figure 1:
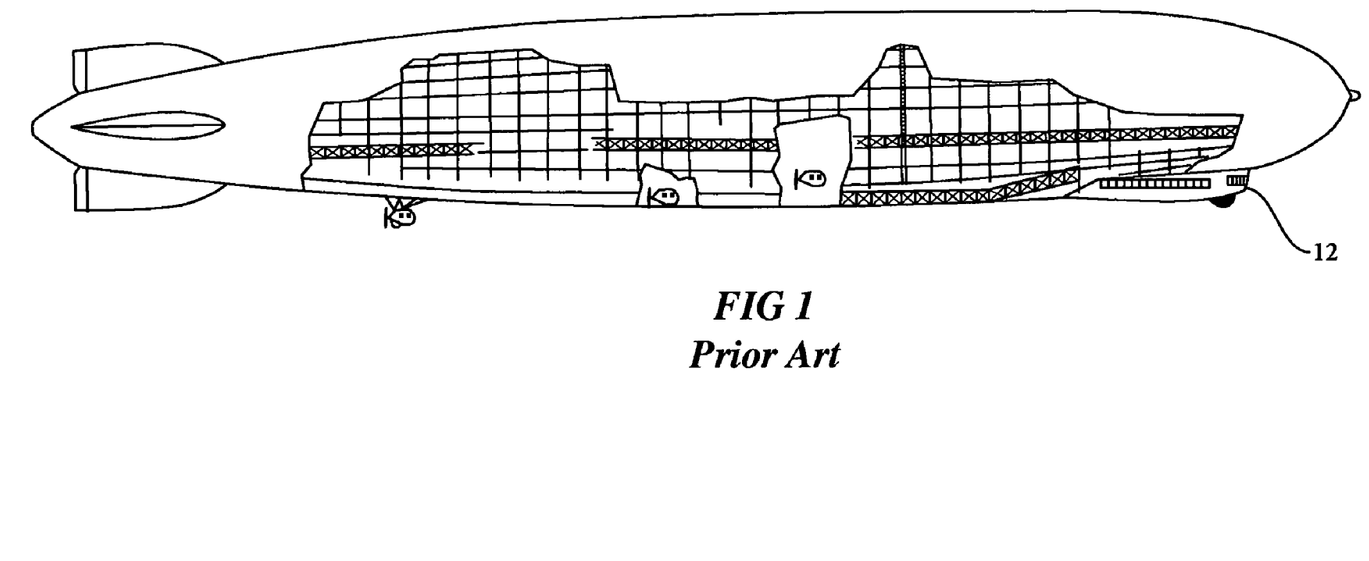
FIG. 1 is a diagrammatic prior art view of a well known rigid airship, the Graf Zeppelin.

FIG. 1, illustrates, by way of background, a well-known prior art rigid airship, the Graf Zeppelin. The passenger gondola 12 was located at the extreme front of the airship. The details of this airship, as well as it's interesting history, is described in an excellent book about the era of the giant airships; "Dr. Eckeners Dream Machine", by Douglas Botting.

Figure 2:
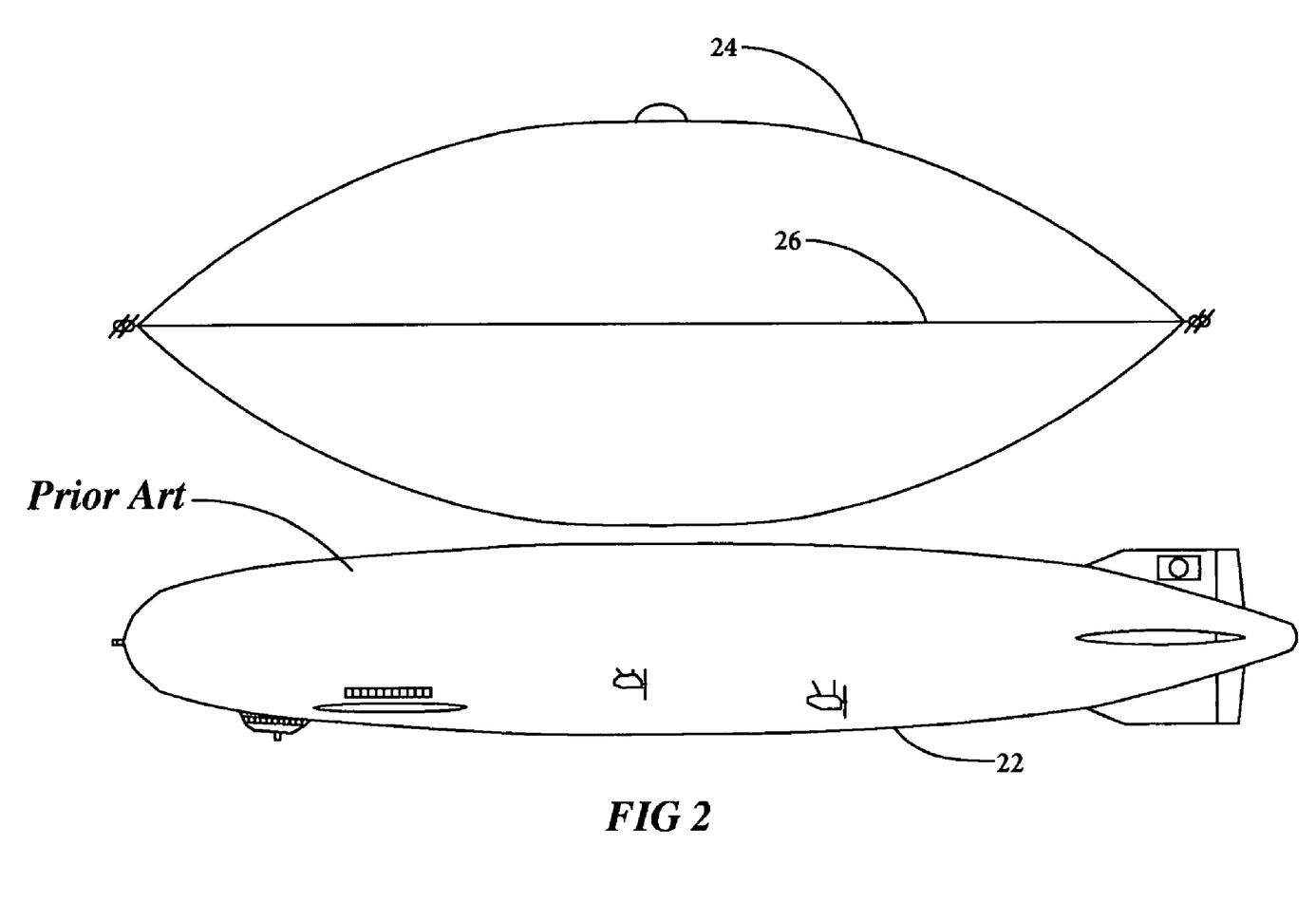
FIG. 2 is a diagrammatic side elevation view of an aspect of the airship of the instant invention.

FIG. 2, for comparison purposes, is a side view of another of the giant airships of the prior art, the Hindenburg 22, compared to the design of the instant invention airship 24, shown next to the Hindenburg. As can be seen the lengths of the two airships is almost identical, that is about 600 feet. The exact length of the instant invention airship is not a critical aspect of the invention. The shape of the instant invention airship is sometimes referred to as a lenticular (bi-convex) shape, composed as two convex surfaces on each side of dividing line 26. Such a lenticular shape is sometimes (whimsically) also referred to as a flying saucer design.

Figure 3:
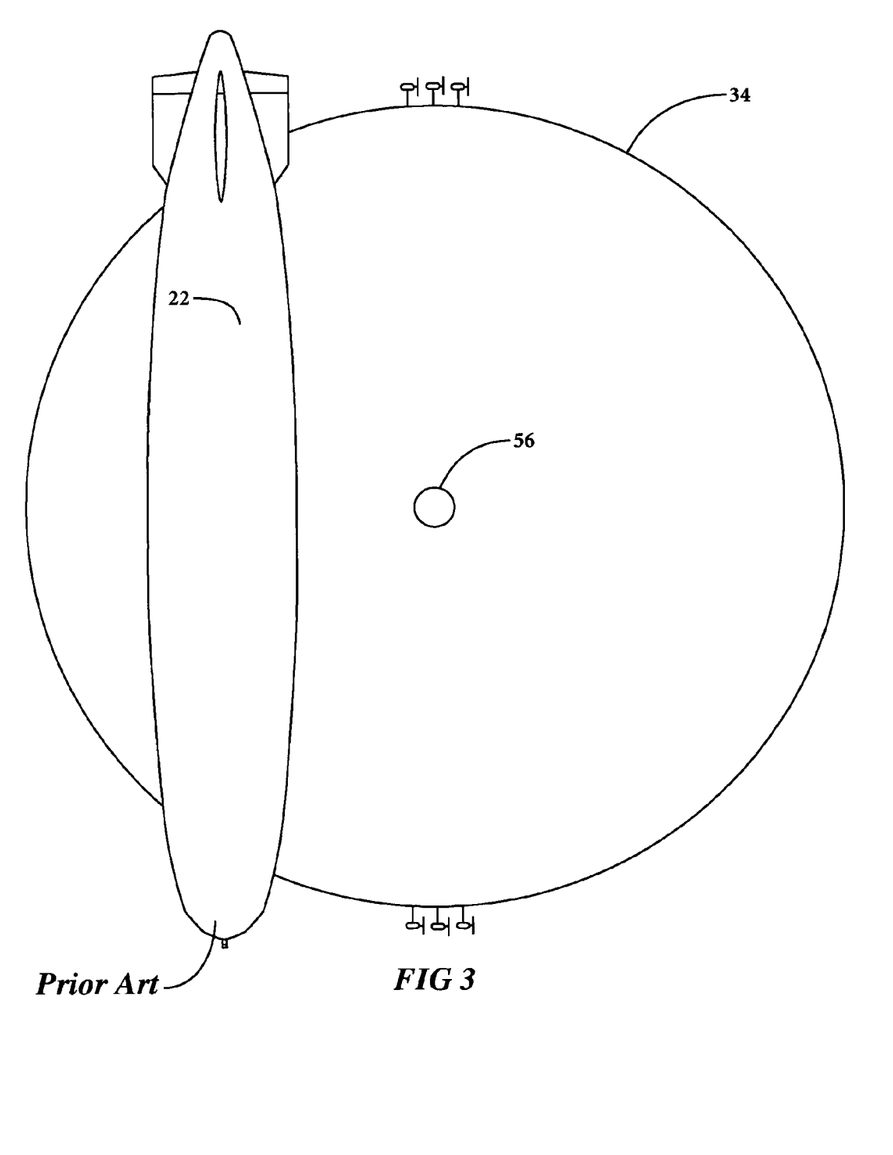
FIG. 3 is a diagrammatic cross section top elevation view of an aspect of the instant invention.

FIG. 3, is also a comparison to the Hindenburg but in a top view, with the Hindenburg 22 shown above the shape of the instant invention airship 34. A top radome 56 is illustrated on the airship of the instant invention. With this view it becomes immediately apparent that the instant invention designed airship has a much larger capacity for buoyant gas and thus a significantly increased lifting capacity, allowing for a significantly larger capacity for either cargo or passengers. Although the numbers are not a critical aspect of the instant invention the Hindenburg had a gas capacity of approximately 7 million cubic feet and the instant invention shown here represents approximately 41 million cubic feet.

Figure 4:
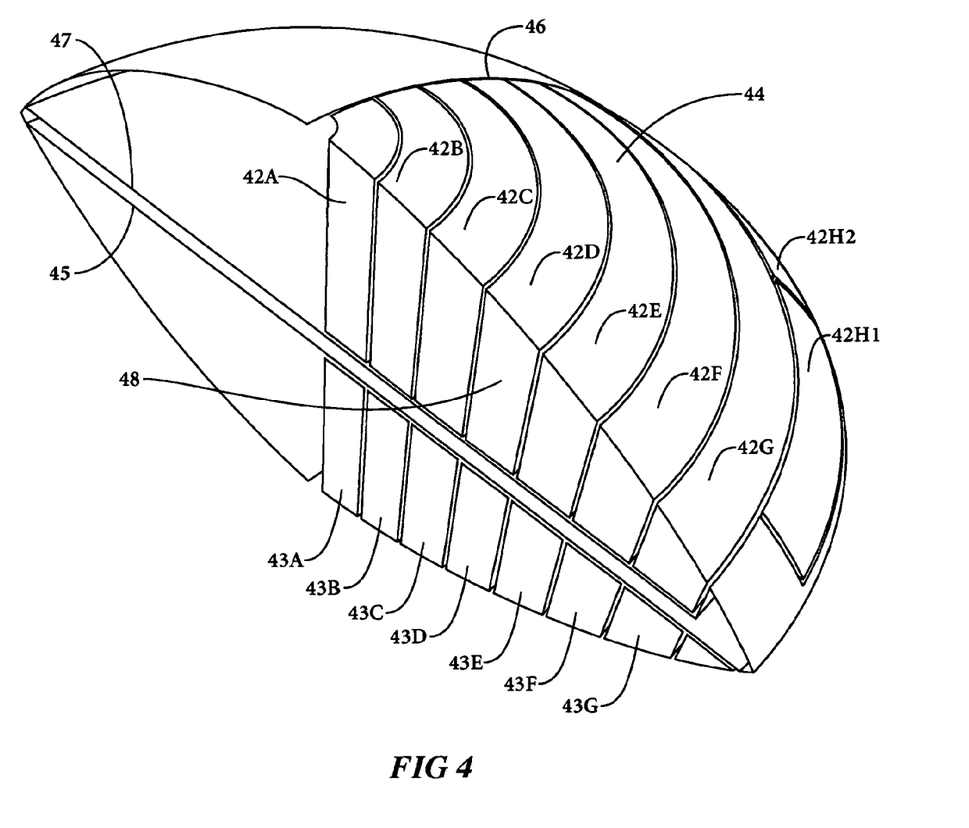
FIG. 4 is an isometric rendering of an aspect of the instant invention airship.
Figure 8:
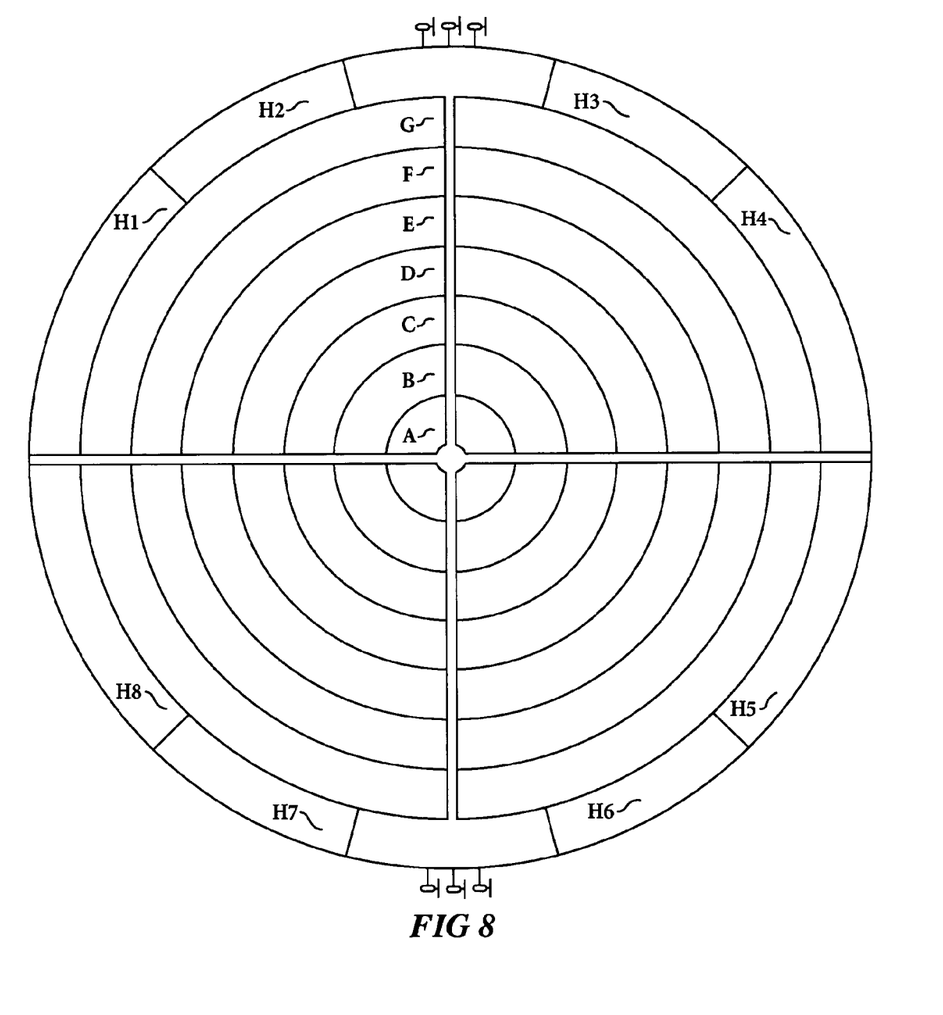
FIG. 8 is a schematic top cross section illustrating a configuration of buoyant gas cells of an aspect of the instant invention.

FIG. 4, is an isometric rendering of a cross section of the instant invention airship, showing an aspect of the instant invention, a series of seven buoyant gas cells 42 (A-G) in the upper half 44 of the airship. These cells encircle the top half of the airship in a horizontal configuration from planes 46 to 48, making up one quadrant of the top of the airship. For purposes of this description the term horizontal refers to a horizontal plane that is approximately parallel to the ground below the airship. At both planes 46 and 48 the gas cells connect to and are in gas communication with matched cells in the next quadrant, leading to a total of 7 connected sets of four buoyant gas cells (or a total of 28) in the top half of the airship. Not completely evident in FIG. 4 is an outer ring of 8 cells, two of which 42H1, 42H2 are illustrated, which will be described in FIG. 8. The top half 44 half of the airship thus has, in this illustration, 36 cells, of which 28 are connected in 7 circles. It is also noted that the gas cell system of the top half of the airship is duplicated in the bottom half of the airship, as shown by cells 43 (A-G) and in 43H. Thus there are a total of 72 buoyant gas cells in the total airship. It should be understood that the exact number of total cells is not a critical part of the instant invention. Two circular planes 45, 47 divide the airship into a top and bottom half. These planes form a horizontal deck 45 and a horizontal ceiling 47 to a very large room with a 20 foot ceiling with approximately 280,000 square feet of payload area for passengers or cargo that dwarfs those of the small gondolas of the giant Zeppelins. Those options will be illustrated later.

Figure 5:
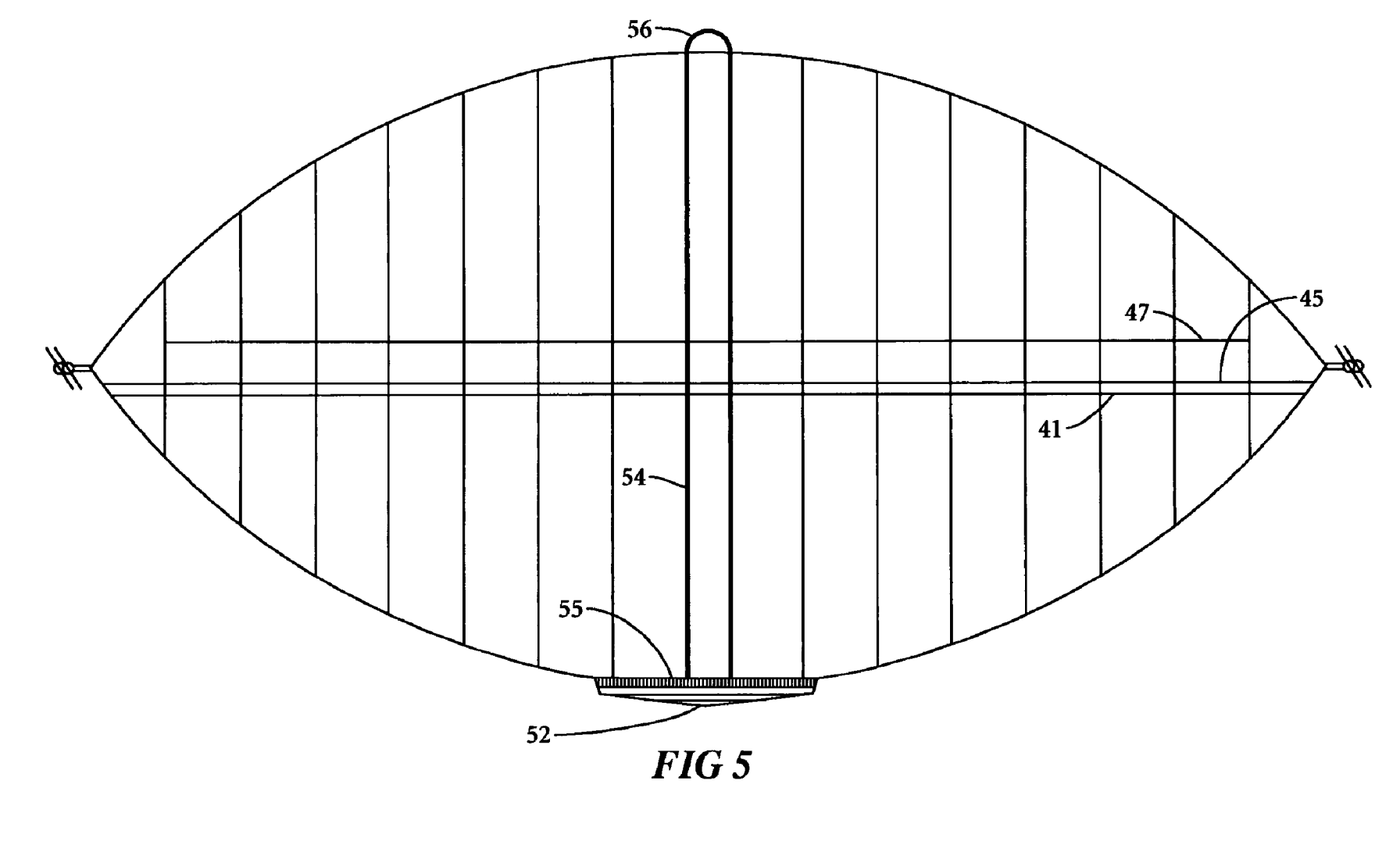
FIG. 5 is a diagrammatic side elevation view of an aspect of the instant invention airship.

FIG. 5, is a side cross-section view of the instant airship. A landing and anchoring mechanism 52 at the bottom center of the airship contains a docking point for anchoring the airship at the bottom of the airship to eliminate the need for a nose cone, as in prior art airships. Landing and anchoring mechanism 52 is also the entry point for passengers and cargo. Landing and anchoring mechanism 52 is the base for a central structural core column 54 that extends to the top of the airship and supports the radome 56 at the top of the structure. This central core also houses the airship elevator system that is used to transport both cargo and passengers from the bottom landing and anchoring mechanism 52. The top of landing and anchoring mechanism 52 can be used as a storage deck 55 for cargo. FIG. 5 also shows the large horizontal deck 45 and ceiling 47 shown previously in FIG. 4. Deck 41 defines a utilities basement located under deck 45.

Figure 6:
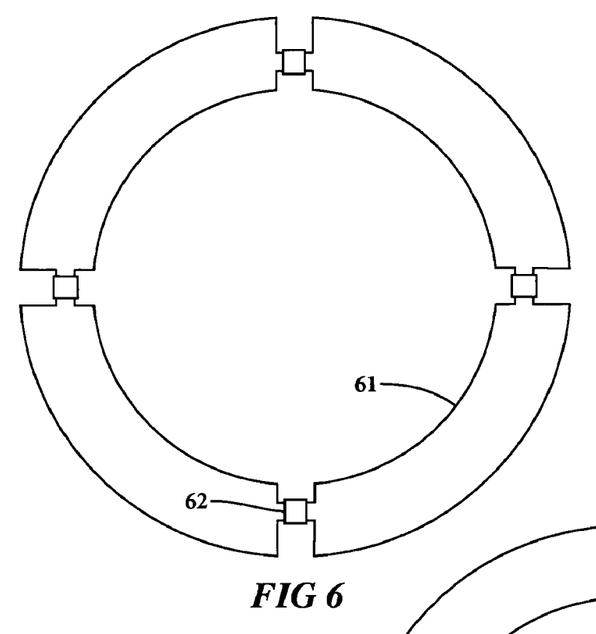
FIG. 6 is a schematic view of a configuration of buoyant gas cells of an aspect of the instant invention.

FIG. 6, illustrates an aspect of the instant invention, a heat exchange system that provides an unprecedented level of control of buoyancy to the airship. As mentioned in describing FIG. 4, the large gas cells that are in each quadrant and connected are in gas communication with matched cells in the next quadrant, leading to a total of 28 buoyant gas cells, connected in groups of four, in the top half of the airship. FIG. 6 shows that connectivity for one set of four connected cells and further that heat exchangers 62 are in the flow path between the cells. The heat exchangers have a heat transfer area and a blower motor that moves buoyant gas around the four quadrants and allows temperature adjustment, and thus buoyancy adjustment to different parts of the airship. The heat exchanger can be of a type that allows both heating and cooling. Or as an alternative design, FIG. 7 illustrates the use of both heating 71 and cooling 73 heat exchangers connecting the gas cell quadrants.

Figure 7:
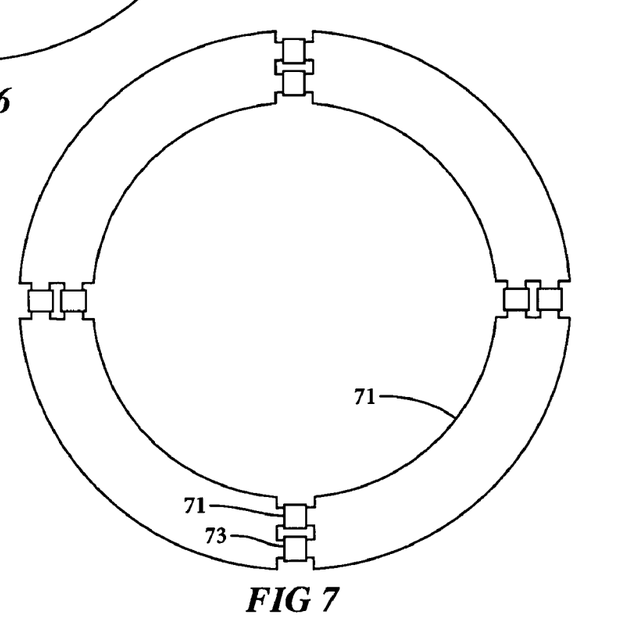
FIG. 7 is a schematic view of a configuration of buoyant gas cells of an aspect of the instant invention.

FIGS. 6 and 7 represent the configuration for any of the inner circles of gas cells. For example, with the seven inner circles shown in FIG. 4, this represents a total of 28 gas cells connected by valved heat exchanger configurations. These 7 inner circles of cells (A thru G) are shown in a top down view in FIG. 8 (without the heat exchangers showing). The outside ring of cells (the H ring) is different. Here there are 8 separate cells (H1-H8) that will have independent temperature control via heat exchange within the cell. These cells provide the function of trim control for the airship, so that the temperature and thus the buoyancy of each of the trim cells can be individually adjusted. It should be evident to those skilled in the art that the control room of the airship of the instant invention would have a computerized trim and altitude control system which would operate off of desired set points of altitude and trim that could sense many key variables, including the trim, altitude, fullness, pressure, and temperatures of the various buoyant gas cells and individually adjust the temperatures to maintain the airship's desired altitude and provide trim control to maintain a smooth flight for passengers and cargo.

Figure 9:
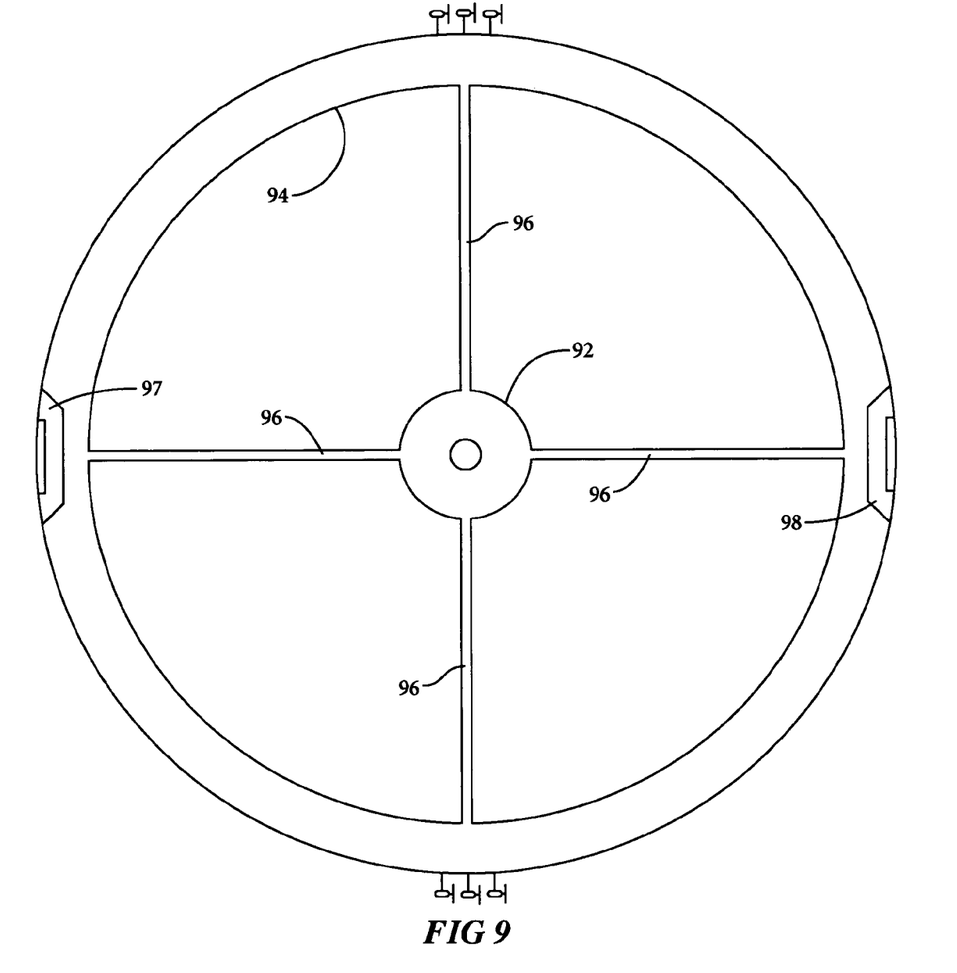
FIG. 9 is a schematic top cross section illustrating a configuration of passenger deck areas for an aspect of the airship of the instant invention.

The airship of the instant invention can be configured to maximize cargo or to maximize passenger area. FIG. 9 is a top down cross section view at the centerline of the airship showing a limited passenger deck 92 at the centerline along with an extensive deck 94 that encircles the airship The deck 92 is horizontal, that is, essentially parallel with respect to the ground. Four passageways 96 communicate from deck 92 to deck 94. Deck 94 also contains the forward 97 and aft 98 control rooms for the operational crew.

Figure 10:
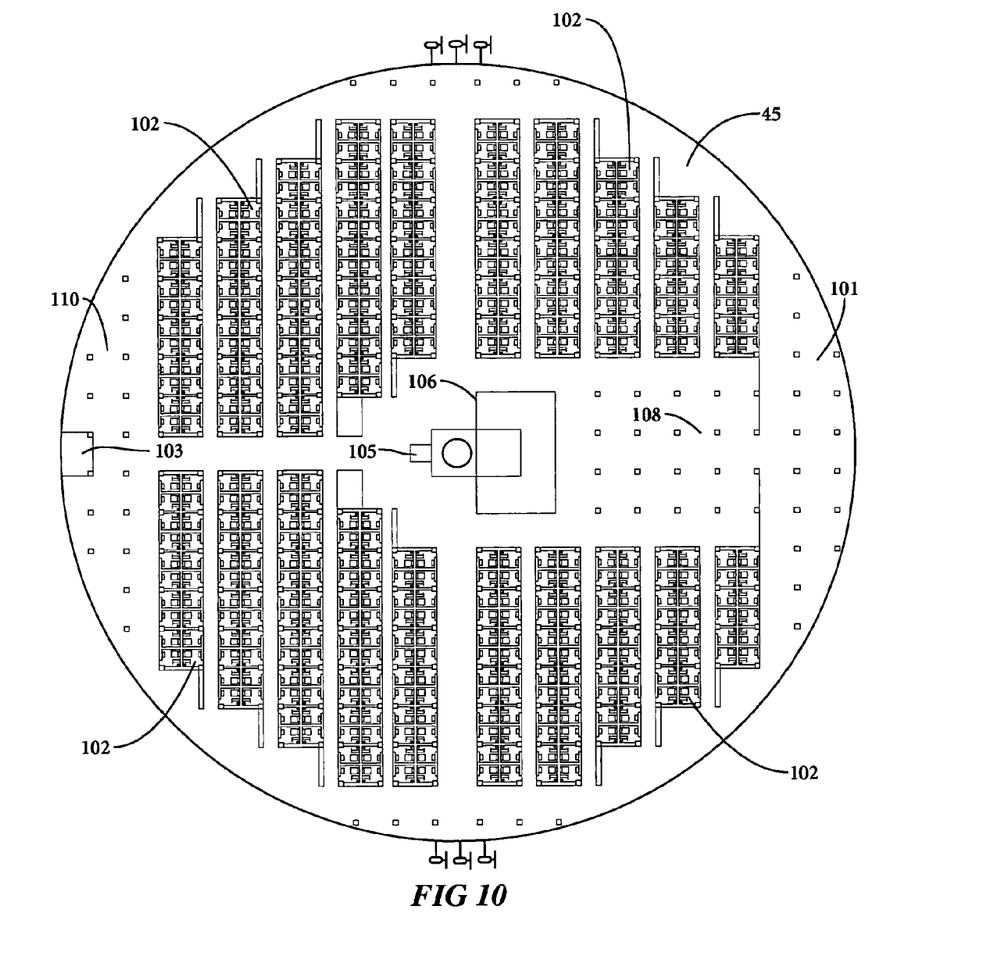
FIG. 10 is an alternate schematic top cross section illustrating a configuration of passenger deck areas for an aspect of the airship of the instant invention.

FIG. 10, is also a top down cross section view at the centerline of the airship illustrating an alternate configuration of the airship in a predominately luxury passenger mode. The overall passenger deck 45 is horizontal, which is essentially parallel with respect to the ground below. Illustrated are staterooms 102 for a large number of passengers, a central area including a kitchen and formal dining area 106, a lounge 108, observation lounge 110, elevator shaft 105, a large forward control room 101, and small auxiliary control room 103. This large passenger area could of course be configured in any number of ways, but in any case offers a much larger passenger area than has previously been available for airships.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one of skill in the art upon a reading of the disclosure.

The invention claimed is:

1. A rigid lenticular shaped airship comprising:
   a. a first (45) and second (47) circular horizontal plane dividing the rigid lenticular shaped airship into an upper convex shaped half (44) and a lower convex shaped half;
   b. a first upper series of buoyant gas cells (42) in a horizontal configuration making up one upper quadrant of said upper convex shaped half (44) of said airship;
   c. additional second, third, and fourth series of upper buoyant gas cells in the three remaining upper quadrants of said upper convex shaped half (44);
   d. wherein said series of upper buoyant gas cells in each upper quadrant of said upper convex shaped half (44) of said airship are connected and in buoyant gas communication with matched upper cells in the adjoining upper quadrants, thereby being connected in upper groups of four, all in the upper convex shaped half (44) of said airship;
   e. and wherein the buoyant gas communication between each of the four upper buoyant gas cells of each of the upper groups of four is made by a self-contained heat exchanger and blower that provides temperature and buoyancy adjustment to each of the upper groups of four upper buoyant gas cells of said upper convex shaped half (44) of said airship
   f. a first lower series of lower buoyant gas cells in a horizontal configuration making up one lower quadrant of said lower convex shaped half of said airship;
   g. additional second, third, and fourth series of lower buoyant gas cells in the three remaining lower quadrants of said lower convex shaped half of said airship;
   h. wherein said series of lower buoyant gas cells in each quadrant of said lower convex shaped half of said airship are connected and in buoyant gas communication with matched cells in the adjoining lower quadrants, thereby connected in lower groups of four, all in the lower convex shaped half of said airship;
   i. and wherein the buoyant gas communication between each of the four lower buoyant gas cells of each of the lower groups of four is made by a self-contained heat exchanger and blower that provides temperature and buoyancy adjustment to each of the lower groups of four lower buoyant gas cells of said lower convex shaped half of said airship.

2. The rigid lenticular shaped airship of claim 1 wherein said heat exchangers provide heating.

3. The rigid lenticular shaped airship of claim 1 wherein said heat exchangers provide heating and cooling.

4. The rigid lenticular shaped airship of claim 1 wherein said first circular horizontal plane (45) forms a floor for a horizontal deck for carrying passengers and said second circular horizontal plane (47) forms a ceiling for said horizontal deck for carrying passengers.

5. The rigid lenticular shaped airship of claim 4 wherein said horizontal deck further comprises a forward (97) control room and an aft (98) control room.

6. The rigid lenticular shaped airship of claim 1 further comprising a landing and anchoring mechanism located near a bottom point (52) of the lower convex shaped half of the airship and comprising a docking device for anchoring the airship and providing an entry and exit point for passengers and cargo.

7. The rigid lenticular shaped airship of claim 6 further comprising a top section (55) of said landing and anchoring mechanism configured to store cargo.

8. The rigid lenticular shaped airship of claim 6 further comprising a central core (54) extending from said landing and anchoring mechanism vertically through the lower and upper convex shaped halves of the airship.

9. The rigid lenticular shaped airship of claim 8 further comprising an elevator system in said central core (54) for transporting passengers or cargo.

10. A method of controlling the buoyancy of a rigid airship comprising the steps of:
   a. providing a first (45) and second (47) circular horizontal plane dividing the airship into an upper convex shaped half and a lower convex shaped half;

b. providing a first upper series of buoyant gas cells (42) in a horizontal configuration making up one upper quadrant of said upper convex shaped half (44) of said airship;

c. providing an additional second, third, and fourth series of upper buoyant gas cells in the three remaining upper quadrants of said upper convex shaped half (44);

d. providing connectivity and buoyant gas communication with matched upper cells in adjacent upper quadrants, thereby connecting said matched upper cells in upper groups of four, all in the upper convex shaped half (44) of said airship;

e. heating or cooling each matched set of upper cells by use of inline heat exchangers and blowers between each of the four upper buoyant gas cells of each upper group of four;

f. providing a first lower series of buoyant gas cells (43) in a horizontal configuration making up one lower quadrant of said lower convex shaped half of said airship;

g. providing an additional second, third, and fourth series of lower buoyant gas cells in the three remaining lower quadrants of said lower convex shaped half;

h. providing connectivity and buoyant gas communication with matched lower cells in adjacent lower quadrants, thereby connecting said matched lower cells in lower groups of four, all in the lower convex shaped half of said airship; and i. heating or cooling each matched set of lower cells by use of inline heat exchangers and blowers between each of the four lower buoyant gas cells of each lower group of four.

* * * * *